United States Patent [19]

Kobayashi et al.

[11] Patent Number: 4,910,363
[45] Date of Patent: Mar. 20, 1990

[54] COORDINATES INPUT APPARATUS WITH PLURAL PULSE TRAIN WHOSE PHASES DIFFER

[75] Inventors: Katsuyuki Kobayashi, Tokyo; Kiyoshi Kaneko, Yokohama, both of Japan

[73] Assignee: Canon Kabushiki Kaisha, Tokyo, Japan

[21] Appl. No.: 377,768

[22] Filed: Jul. 10, 1989

Related U.S. Application Data

[63] Continuation of Ser. No. 207,954, Jun. 17, 1988, abandoned.

[30] Foreign Application Priority Data

Jun. 25, 1987 [JP] Japan .................. 62-156666

[51] Int. Cl.⁴ .............................................. G08C 21/00
[52] U.S. Cl. ........................................ 178/18; 178/19; 367/907; 367/901
[58] Field of Search ............... 178/18, 19; 340/706; 367/102, 907, 901

[56] References Cited

U.S. PATENT DOCUMENTS

4,665,282 5/1987 Sato et al. ................... 118/18

Primary Examiner—Stafford D. Schreyer
Attorney, Agent, or Firm—Fitzpatrick, Cella, Harper & Scinto

[57] ABSTRACT

There is provided a coordinates input apparatus comprising: a vibrator drive controller to output a vibrator drive signal obtained by synthesizing a plurality of pulse trains whose phases differ; a vibration pen to generate a vibration from a vibrator which generates the vibration in response to the vibration drive signal output from the vibrator drive controller; a vibration propagating plate made of a transparent acrylic or glass plate to propagate the vibration generated by the vibration pen; a plurality of vibration sensors, attached to the vibration propagating plate, for detecting the vibration generated by the vibration pen at a plurality of positions; and a coordinate value calculation/control circuit for calculating the vibration propagating times from the vibrations detected by the vibration sensors at a plurality of positions, thereby obtaining the coordinate values on the vibration propagating plate on which the vibration pen is located from the propagating times calculated. With this apparatus, the influences of noise such as reflected waves on the vibration propagating plate can be eliminated, so that the vibration detecting point or a special point on the waveform can be accurately set.

15 Claims, 7 Drawing Sheets

COORDINATES INPUT APPARATUS WITH PLURAL PULSE TRAIN WHOSE PHASES DIFFER

This application is a continuation of application Ser. No. 207,954 filed June 17, 1988, abandoned.

BACKGROUND OF THE INVENTION

1. Field of the Invention

The present invention relates to a coordinates input apparatus and, more particularly, to a coordinates input apparatus in which the vibration which is input by a vibration pen is detected by a plurality of sensors attached to a vibration propagating plate and the coordinates of the vibration pen on the vibration propagating plate are detected.

2. Related Background Art

Various kinds of input apparatuses have conventionally been known as coordinates input apparatuses. In this kind of apparatus, a coordinate system is set on a predetermined input surface, coordinates are input onto the input surface by an input device of a predetermined system, and the coordinate information on the coordinate system on the input surface is detected.

As a detecting system, there is known a system in which an input tablet is constituted by arranging a resistive film and a conductive film so as to face each other, and these films are touched by a writing tool such as finger, pen, or the like, or a system in which an input member consisting of an ultrasonic pen or the like is used, an ultrasonic vibration is input to an input tablet consisting of a vibration propagating plate or the like, and the coordinate values are detected from the vibration propagating time of the elastic wave which is generated on the tablet, or the like.

According to the latter system by the vibration propagation, a plurality of vibration sensors consisting of a plurality of piezoelectric elements or the like each for converting the mechanical vibration to the electric signal are attached to the glass plate constituting the tablet and the other vibration propagating plate in order to calculate the propagating time of the vibration which is propagated.

If the vibration input timing has already been known, by detecting the arrival timing of the vibration to the vibration sensor, the vibration propagating time to the sensor can be known. Since the vibration propagating speed on the vibration propagating plate is considered to be constant, the distance of the straight line between the vibration sensor and the input point can be obtained from the vibration propagating time. If the distance of the straight line between each sensor and the input point is known, the coordinate values of the input point can be determined by the theorem of three squares or the like.

According to such conventional systems, a method whereby the peak value of the detection signal waveform which is output from the vibration sensor is detected is used to decide the vibration detecting timing.

However, the vibration propagating plate has limited area and some reflected waves are certainly generated in the edge portion areas. Therefore, the vibration waveform which is input to the vibration sensor is the synthesis wave of the direct wave and the reflected waves.

In particular, the difference between the paths of the direct wave and reflected wave is very small in dependence on the positional relations among the coordinate input point, the sensor, and the edge portions of the vibration propagating plate. The detection signal waveform is largely distorted due to the interference between them. There is a problem such that a deviation occurs in the detection timing due to this influence and the coordinate detecting accuracy deteriorates.

There is also known a technique to support the edge portions of the vibration propagating plate by a vibration proofing material or the like in consideration of the foregoing point. However, it is difficult to perfectly eliminate the reflected waves. The area of the effective input surface is made smaller than the size of the vibration propagating plate, thereby allowing the direct wave and the reflected waves to reach the sensor with time lags, and the occurrence of the deviation of the detection timing due to the interference must be prevented.

Therefore, to assure the area of the necessary effective input surface, the area of the vibration propagating plate must be set to be a large value. There is a problem such that the size of the apparatus increases or the area of the effective input surface is limited.

SUMMARY OF THE INVENTION

It is the first object of the present invention to provide a coordinates input apparatus in which the vibration which is input by a vibration pen is detected by a plurality of sensors attached to a vibration propagating plate and the coordinates of the vibration pen on the vibration propagating plate are detected, wherein by providing drive control means for driving a vibrator of the vibration pen by a synthetic signal of a plurality of pulse trains whose phases differ, the drive pulse trains having different phases function so as to attenuate the attenuating vibration of the vibrator, so that even if the direct wave and reflected waves are interfered in the vibration sensor, the deviation of the peak value of the detection signal waveform is prevented, and the coordinate detection difference due to the difference between the vibration propagating times can be reduced.

The second object of the invention is to provide a coordinates input apparatus in which the detection waveform in a vibration sensor can be controlled into a desired shape by combining a plurality of pulses of different phases, and the detection timing or a special point on the waveform which is suitable to eliminate the influence of noise such as reflected waves on the vibration propagating plate and the like can be set.

DETAILED DESCRIPTION OF THE PREFERRED EMBODIMENTS

The present invention will be described in detail hereinbelow on the basis of an embodiment shown in the drawings.

Figure 1:
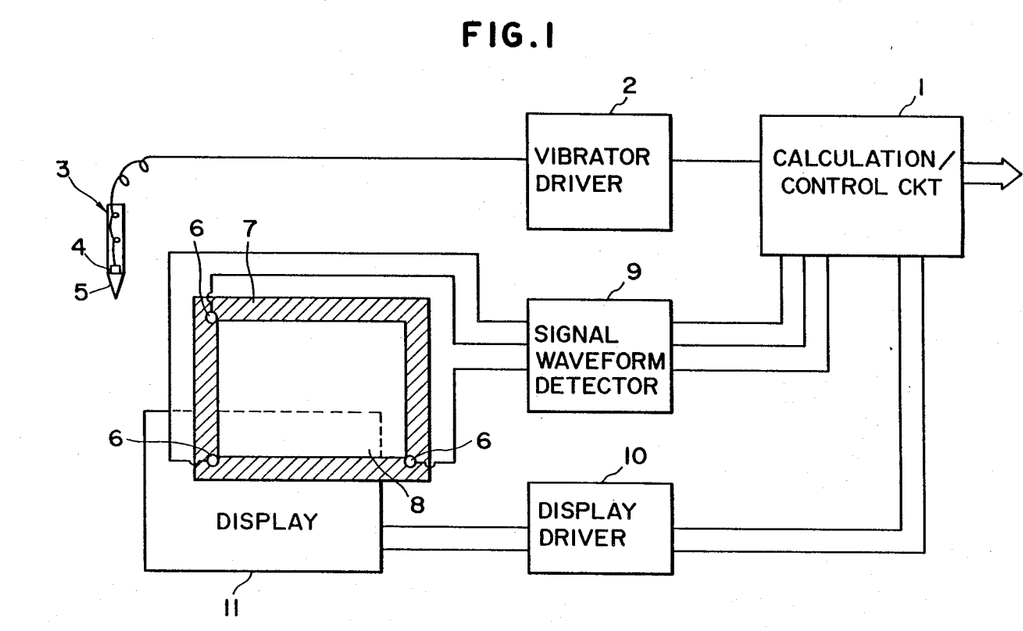
FIG. 1 is an explanatory diagram showing an arrangement of an information input/output apparatus to which the present invention is applied.

FIG. 1 shows an arrangement of an information input/output apparatus to which the invention is applied. In the information input/output apparatus of FIG. 1, coordinates are input by a vibration pen 3 to an input tablet consisting of a vibration propagating plate 8, thereby displaying an input image on a display 11 consisting of a CRT arranged overlappingly on the input tablet in accordance with the input coordinate information.

In FIG. 1, the vibration propagating plate 8 is made of an acrylic plate, glass plate, or the like and propagates the vibration which is propagated from the vibration pen 3 to three vibration sensors 6 attached to the corner portions of the plate 8. In this embodiment, the coordinates of the vibration pen 3 on the plate 8 are detected by measuring the propagating times of the ultrasonic vibrations propagated to the sensors 6 from the vibration pen 3 through the plate 8.

The peripheral portion of the vibration propagating plate 8 is supported by a reflection preventing material 7 such as silicone rubber or the like in order to prevent that the vibration propagated from the vibration pen 3 is reflected by the peripheral portion and returned toward the central portion.

The vibration propagating plate 8 is arranged on the display 11 such as a CRT (or liquid crystal display or the like) which can display an image by dots. The plate 8 displays an image by dots at the positions traced by the vibration pen 3. That is, the dots are displayed at the position on the display 11 corresponding to the coordinates of the pen 3 detected. The image consisting of elements such as point, line, or the like which was input by the vibration pen 3 appears after the track of the vibration pen as if it was written on a paper.

On the other hand, according to such a constitution, it is also possible to use an input system such that a menu is displayed on the display 11 and a desired item in this menu is selected by using the vibration pen, or an input system such that a prompt is displayed and the vibration pen 3 is touched to a predetermined position, or the like.

The vibration pen 3 to propagate the ultrasonic vibration to the vibration propagating plate 8 has therein a vibrator 4 consisting of a piezoelectric element or the like. The ultrasonic vibration generated by the vibrator 4 is propagated to the plate 8 through a horn portion 5 having a pointed tip.

Figure 2A:
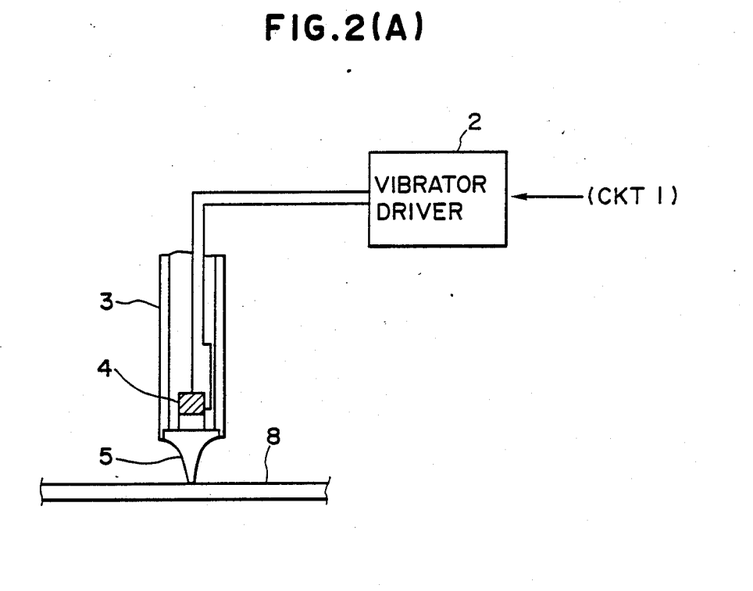
FIG. 2A is an explanatory diagram showing a structure of a vibration pen in FIG. 1.

FIG. 2A shows a structure of the vibration pen 3. The vibrator 4 attached in the pen 3 is driven by a vibrator driver 2. A drive signal of the vibrator 4 is supplied as a low-level pulse signal from a calculation/control circuit 1 in FIG. 1 and amplified at a predetermined gain by the vibrator driver 2 which can drive at a low impedance. Thereafter, the amplified drive signal is applied to the vibrator 4.

The electrical drive signal is converted into the mechanical ultrasonic vibration by the vibrator 4 and propagated to the vibration propagating plate 8 through the horn portion 5.

The oscillating frequency of the vibrator 4 is set to such a value that a plate wave can be generated in the vibration propagating plate 8 made of acryl, glass, or the like. On the other hand, when the vibrator is driven, a vibrating mode such that the vibrator 4 vibrates mainly in the vertical direction of the diagram for the plate 8 is selected. Further, by setting the oscillating frequency of the vibrator 4 to the resonant frequency of the vibrator 4, the vibration can be efficiently converted.

The elastic wave which is propagated to the plate 8 as mentioned above is the plate wave and has the advantage such that it is hardly influenced by scratches on the surface of the plate 8, obstacles or the like as compared with the surface wave or the like.

Figure 2B:
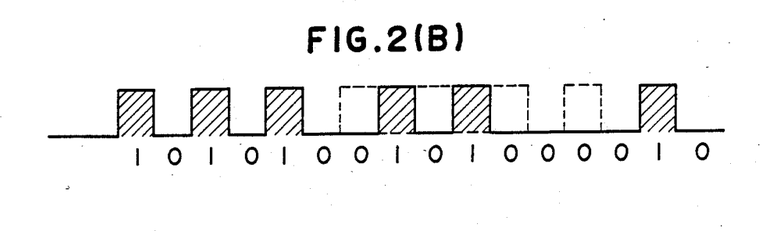
FIGS. 2B and 2C are waveform diagrams showing a vibrator drive waveform and a detection waveform in the invention, respectively.

FIG. 2B shows a waveform of a drive signal of the vibrator 4. The vibrator 4 is driven by a pulse waveform as shown in the diagram. Hitherto, the vibrator 4 has been driven by a pulse train (1, 0, 1, ...) in which pulses are generated at regular intervals as shown in FIG. 2D. However, in the embodiment, the drive signal is constituted by a pulse train (1010100101000010) of the first group whose pulses are arranged at regular intervals and a subsequent pulse train of the second group whose phase is deviated by 180°. The pulse trains as shown in the diagram are input to the vibrator 4 every predetermined period of time.

Advantages which are obtained by use of such a drive signal will be explained in detail hereinbelow.

Returning to FIG. 1, the vibration sensors 6 attached to the corner portions of the vibration propagating plate 8 also consist of mechanical/electrical converting elements such as piezoelectric elements or the like. Each output signal of the three vibration sensors 6 is input to a signal waveform detector 9 and converted into an detection signal which can be processed by the calculation/control circuit 1 provided at the post stage. The calculation/control circuit 1 measures the vibration propagating times and detects the coordinate position of the vibration pen 3 on the vibration propagating plate 8.

The coordinate information of the vibration pen 3 detected is processed by the calculation/control circuit 1 in accordance with the output method by the display 11. That is, the calculation/control circuit controls the output operation of the display 11 through a display driver 10 on the basis of the input coordinate information.

Figure 3:
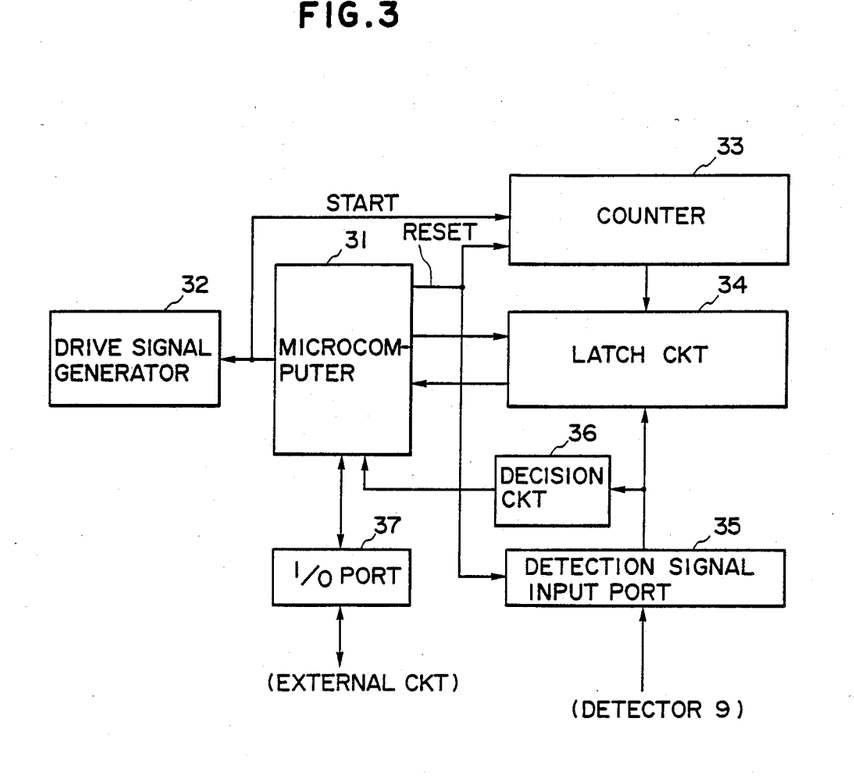
FIG. 3 is a block diagram showing an arrangement of a calculation/control circuit in FIG. 1.

FIG. 3 shows an arrangement of the calculation/control circuit 1 in FIG. 1. In this case, this diagram mainly shows structures of a driving system of the vibration pen 3 and a vibration detecting system by the vibration sensors 6.

A microcomputer 31 has therein an internal counter, an ROM, and an RAM. A drive signal generator 32 outputs drive pulses of a predetermined frequency to the vibrator driver 2 in FIG. 1 and is made operative by the microcomputer 31 synchronously with the circuit to calculate the coordinates.

A count value of a counter 33 is latched into a latch circuit 34 by the microcomputer 31.

On the other hand, the signal waveform detector 9 outputs timing information of the detection signal to measure the vibration propagating time for detection of the coordinates and signal level information for detection of writing pressure from the outputs of the vibration sensors 6. This timing information and this level information are input to a detection signal input port 35 and to an input/output port 37, respectively.

The timing signal which is input from the waveform detector 9 is input to the input port 35 and compared with the count value in the latch circuit 34 by a decision circuit 36. The result of the comparison is input to the microcomputer 31. That is, the vibration propagating time is represented as a latch value of the output data of the counter 33. The coordinates are calculated by the value of the vibration propagating time.

The output control process of the display 11 is executed through the I/O port 37.

Figure 4:
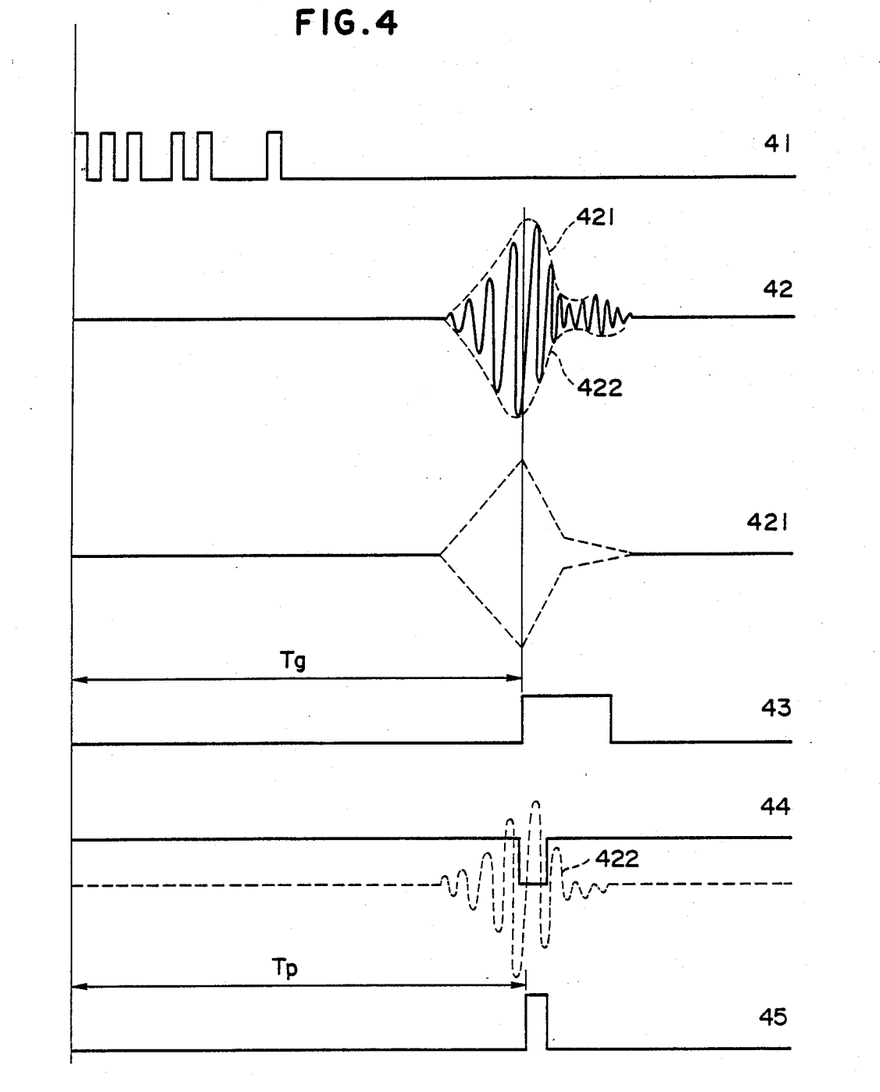
FIG. 4 is a waveform diagram showing detection waveforms for explaining the measurement of the distance between a vibration pen and a vibration sensor.

FIG. 4 is a diagram for explaining a detection waveform which is input to the waveform detector 9 in FIG. 1 and the process for measuring the vibration propagating time based on the input detection waveform. In FIG. 4, a drive signal pulse 41 is applied to the vibration pen 3. The ultrasonic vibration propagated to the vibration propagating plate 8 from the pen 3 driven by such a waveform is propagated by the plate 8 and detected by the vibration sensors 6.

After the vibration progressed in the plate 8 for a time $t_g$ corresponding to the distance between the vibration input position to each vibration sensor 6, the vibration reaches the vibration sensor 6. In FIG. 4, reference numeral 42 denotes a signal waveform detected by the vibration sensor 6. In this embodiment, since the dispersive plate wave is used, the relation between an envelope 421 and a phase 422 of the detection waveform changes in accordance with the vibration propagating distance It is now assumed that a group velocity of the envelope is $V_g$ and a phase velocity is $V_p$. The distance between the vibration pen 3 and the vibration sensor 6 can be detected from the difference between the group velocity and the phase velocity.

First, when an attention is paid to only the envelope 421, its velocity is $V_g$. When detecting a point on a certain special waveform, e.g., the peak as indicated at 43 in FIG. 4, the distance d between the pen 3 and the sensor 6 is obtained as follows by assuming that its vibration propagating time is $t_g$.

$$d = V_g \cdot t_g \quad (1)$$

This equation relates to one of the vibration sensors 6. The distance between each of the other two vibration sensors 6 and the vibration pen 3 can be also obtained by the same equation.

Further, to determine the coordinate values at a higher accuracy, the process based on the detection of the phase signal is executed. When it is assumed that the time interval until a special detection point of the phase waveform 422 in FIG. 4, for example, until the zero-cross point after passage of the peak point from the vibration applied timing is $t_p$, the distance between the vibration sensor and the vibration pen can be obtained by $$d = n \cdot \lambda_p + V_p \cdot t_p \quad (2)$$

where, $\lambda_p$ denotes a wavelength of the elastic wave and n is an integer.

The integer n is shown as follows from the above equations (1) and (2).

$$n = [(V_g \cdot t_g - V_p \cdot t_p)/\lambda_p + 1/N] \quad (3)$$

where, N is a real number other than 0 and a proper numerical value is used. For example, when N=2 and the wavelength is within $\pm \frac{1}{2}$, n can be decided.

By substituting the value of n obtained as mentioned above for the equation (2), the distance between the pen 3 and the sensor 6 can be accurately measured.

Figure 5:
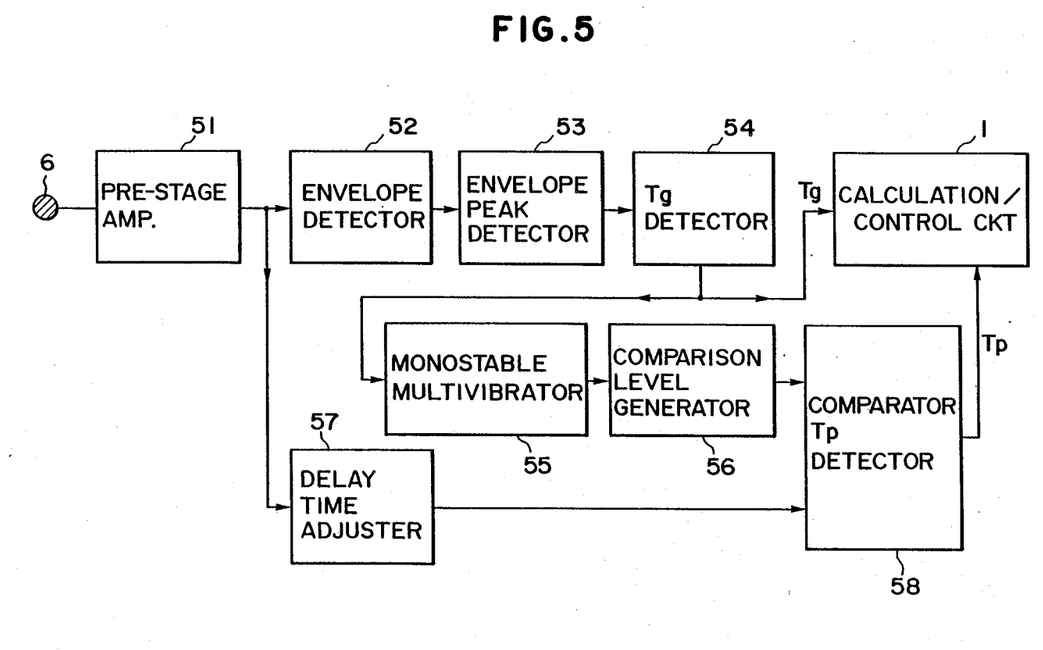
FIG. 5 is a block diagram showing an arrangement of a waveform detector in FIG. 1.

To measure the two vibration propagating times $t_g$ and $t_p$ shown in FIG. 4, the signal waveform detector 9 can be constituted as shown in, e.g., FIG. 5.

In FIG. 5, the output signal of the sensor 6 is amplified to a predetermined level by a pre-stage amplifier 51.

The amplified signal is input to an envelope detector 52 and only the envelope of the detection signal is taken out. The timing of the peak of the extracted envelope is detected by an envelope peak detector 53. An envelope delay time detection signal $T_g$ of a predetermined waveform is formed from the peak detection signal by a signal detecter 54 constituted by a monostable multivibrator and the like. The signal $T_g$ is input to the calculation/control circuit 1.

A phase delay time detection signal $T_p$ is formed by a signal detector 58 from the timing of the $T_g$ signal and the original signal delayed by a delay time adjuster 57. The signal $T_p$ is input to the calculation/control circuit 1.

That is, the $T_g$ signal is converted into a pulse of a predetermined width by a monostable multivibrator 55. On the other hand, a comparison level generator 56 forms a threshold value to detect the $t_p$ signal in accordance with this pulse timing. Thus, the generator 56 forms a signal 44 having a level and a timing as shown in FIG. 4 and inputs to the detector 58.

Namely, the monostable multivibrator 55 and comparison level generator 56 are provided for allowing the phase delay time to be measured only for a constant period of time after the peak value of the envelope was detected.

An output signal of the generator 56 is input to the detector 58 consisting of a comparator or the like and compared with the delayed detection waveform as shown in FIG. 4. Thus, a $t_p$ detection pulse 45 is formed.

The foregoing circuit relates to one of the sensors 6. The same circuit is also provided for each of the other sensors 6. Assuming that the number of sensors is set to a general value h, the h detection signals of the envelope delay times $T_{gl}$ to $T_{gh}$ and the h detection signals of the phase delay times $T_{pl}$ to $T_{ph}$ are input to the calculation/control circuit 1, respectively.

The former half and the latter half of the envelope waveform 421 shown in FIG. 4 are asymmetrical. Particularly, the attenuating portion of the envelope waveform 421 is steep. Such an envelope is generated due to the constitution of the drive signal pulse 41 in FIGS. 2A and 4. The relation between the constitution of the drive pulse and the detection waveform will be described in detail hereinbelow.

In the calculation/control circuit in FIG. 3, the signals $T_{gl}$ to $T_{gh}$ and $T_{pl}$ to $T_{ph}$ are input from the input port 35. The count value of the counter 33 is latched into the latch circuit 34 by using the timing of each signal as a trigger signal. Since the counter 33 starts counting synchronously with the driving of the vibration pen, the data indicative of the delay times of the envelope and phase are latched into the latch circuit 34, respectively.

Figure 6:
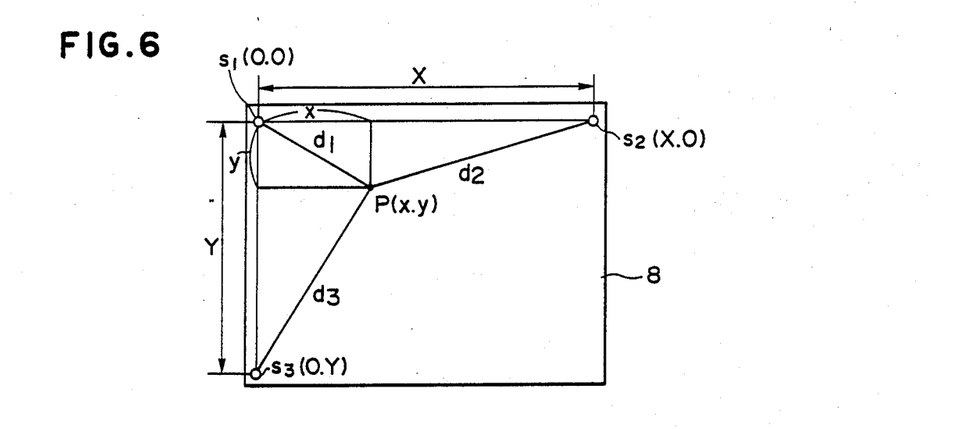
FIG. 6 is an explanatory diagram showing an arrangement of the vibration sensors.

As shown in FIG. 6, when three vibration sensors 6 are arranged at the corner positions $S_1$ to $S_3$ of the vibration propagating plate 8, the distances $d_1$ to $d_3$ of the straight lines from the position P of the vibration pen 3 to the positions of the sensors 6 can be obtained by the processes described in conjunction with FIG. 4. Further the coordinates (x, y) of the position P of the pen 3 can be further obtained by the calculation/control circuit 1 on the basis of the distances $d_1$ to $d_3$ from the theorem of three squares as follows.

$$x = X/2 + (d_1 + d_2)(d_1 - d_2)/2X \quad (4)$$

$$y = Y/2 + (d_1 + d_3)(d_1 - d_3)/2Y \quad (5)$$

where, X and Y represent distances along the X and Y axes between the sensors 6 at the positions $S_2$ and $S_3$ and the origin (position $S_1$).

The position coordinates of the pen 3 can be detected in a real-time manner as described above.

In this embodiment, as mentioned above, the vibrator 4 of the vibration pen 3 is driven by the drive signal consisting of two continuous pulse trains whose phases differ by 180° as shown in FIG. 2B.

Figure 2C:
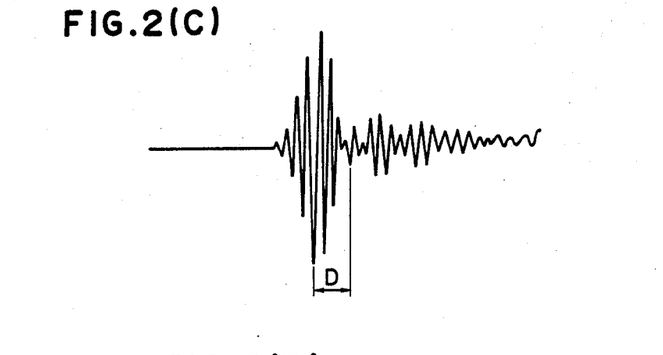
Figure 2D:
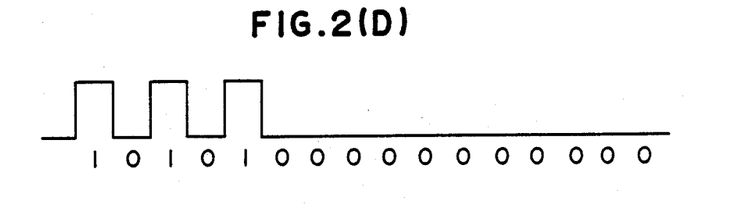
FIGS. 2D and 2E are waveform diagrams showing conventional vibrator drive waveform and detection waveform, respectively.
Figure 2E:
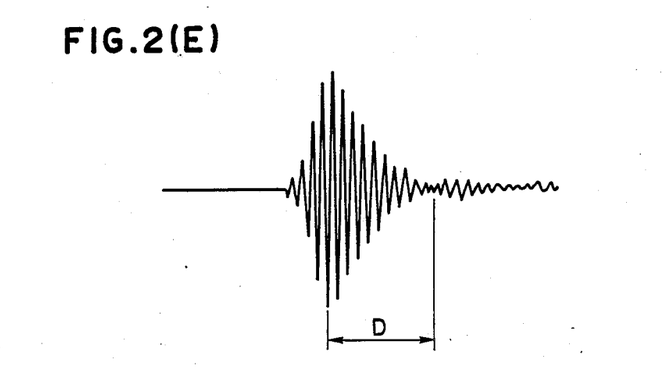

FIGS. 2C and 2E show detection signal waveforms which are obtained by one of the vibration sensors 6 in the embodiment of FIG. 2B and in the conventional example of FIG. 2D, respectively. By comparing them, it will be understood that the drive pulse train in the embodiment in the period of time D of the detection vibration waveform more steeply attenuates.

This is because after the first pulse train in FIG. 2B reaches the detecting point, the subsequent pulse train whose phase is deviated by 180° and which arrives late functions so as to set off the vibration near the detecting point.

In the conventional detection waveform as shown in FIG. 2E, it gently attenuates in the period of time D and the level is also high. Therefore, if the attenuating portion is interfered by the reflected wave because of the reason such that the difference between the length of the direct wave path and the reflected wave path is small, it is also considered that a peak value larger than the peak value of the direct wave is caused.

However, according to the detection signal waveform as shown in FIG. 2C, the level in the attenuating portion is small and the attenuation is promptly executed. Therefore, even if the reflected waves are synthesized, a peak value larger than the direct wave is not caused, so that no deviation occurs between the vibration detection timings.

In this manner, the accurate vibration propagating time can be obtained and the high coordinate detecting accuracy can be held.

The possibility such that the detection waveforms of the reflected waves are synthesized in the portion of the high level of the detection waveform of the direct wave becomes higher as the effective input range of the vibration propagating plate 8 and the portion where the reflected wave occurs, for example, the boundary portion between the reflection preventing material 7 and vibration propagating plate 8 or the edge of the plate 8 is close. This is because the propagating path lengths of the reflected wave and of the direct wave are close.

Hitherto, in order to avoid the synthesis of the direct wave and reflected wave by increasing as large as possible the difference between the propagating path lengths of the reflected wave and direct wave as mentioned above, the effective input range has been limited by surrounding this range by the tablet cover or the like. However, according to the embodiment, the range of the time when no problem occurs even if the direct wave and the reflected wave which arrives later than the direct wave overlap can be enlarged, so that the effective input range can be allowed to approach the edge portion of the tablet, i.e., it can be widened. On the other hand, in the case of the same effective input area, the whole apparatus can be miniaturized or this means that the large effective input area can be obtained at the same size of the apparatus.

In the embodiment, as shown in FIG. 2B, the pulse trains of the first group (three pulse trains are shown in the case of FIG. 2B) and the subsequent pulse trains of the second group (two pulse trains are shown in the case of FIG. 2B) whose phases are deviated by 180° and whose number is nearly equal to that of the first group pulse trains are given to the vibrator 4 of the pen 3. However, in the case of giving the pulses of a plurality of groups having different phases to the vibrator, the constitution is not limited to the above constitution but can be arbitrarily set.

Figure 7A:
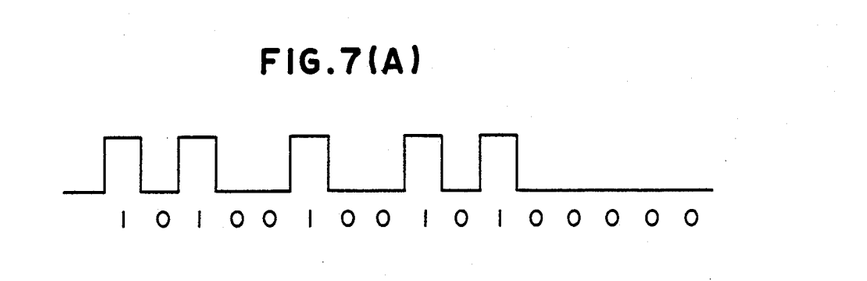
FIGS. 7A and 7B are waveform diagrams showing drive waveforms of vibrators in different embodiments, respectively.

For example, as shown in FIG. 7A, the pulse trains of three groups whose phases are respectively deviated by 180° can be also used.

In the case of FIG. 7A, the drive signal of the vibrator of the vibration pen 3 is constituted by continuous pulse groups whose phases are respectively deviated by 180° in such a manner that the first group consists of two pulses, the second group consists of one pulse, and the third group consists of two pulses.

Figure 7B:
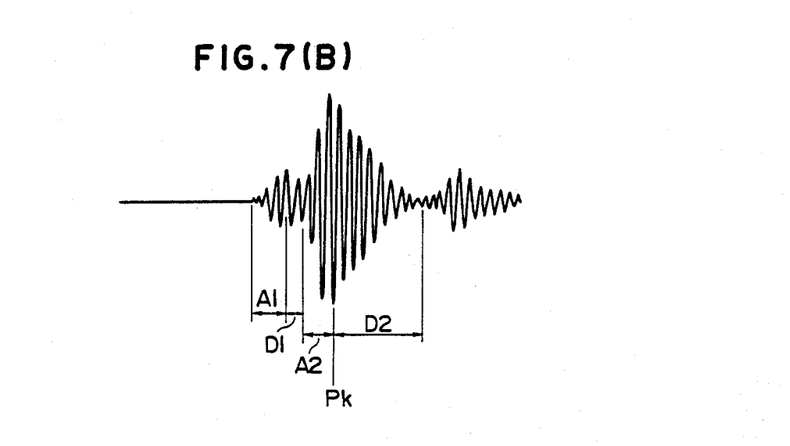

In the case of using such a drive signal, the detection waveform by one of the vibration sensors 6 is as shown in FIG. 7B. Namely, the envelope rises for the period of time $A_1$ by the pulses of the first group and the envelope attenuates by one pulse of the second group for the period of time $D_1$. Subsequently, since the pulses of the third group whose phase is equal to that of the first group arrive before the waveform completely attenuates, the envelope peak $P_k$ occurs. Thereafter, the waveform attenuates for the period of time $D_2$ at the almost same speed as that in the conventional example of FIG. 2E.

According to such a detection waveform, the vibration detecting timing can be determined by detecting the inflection point of the envelope which occurs for the period of time $D_1$. By the drive pulses as shown in FIG. 7A, the inflection point is provided in the front portion of the detection waveform as shown in FIG. 7B and the timing for the inflection point is set to the detecting point, thereby moving the vibration detecting timing to the position before the detection waveform. Due to this, the reflected wave which arrives at the detecting point later than the direct wave exerts an influence on the envelope waveform Thus, it is possible to further reduce a risk that a difference may occur in the vibration detecting timing.

The waveform attenuating speed or depth thereof for the attenuating period of time $D_1$ in FIG. 7B can be variously changed so as to be easily detected in accordance with the number of pulses which constitute the drive signal and whose phases differ or the like.

As is obvious from the above description, according to the invention, in a coordinates input apparatus in which the vibration which is input from the vibration pen is detected by a plurality of sensors attached to a vibration propagating plate and the coordinates of the vibration pen on the vibration propagating plate are detected, there is provided drive control means for driving a vibrator of the vibration pen by a synthetic signal of a plurality of pulse trains whose phases differ. Therefore, since the drive pulse trains having different phases function so as to attenuate the attenuating vibration of the vibrator, even if the direct wave and reflected waves are interfered in the vibration sensor, the deviation of the peak value of the detection signal waveform can be prevented and the coordinates detection error due to the difference of the vibration propagating times can be reduced. Accordingly, there is no need to limit the area of the effective input surface of the vibration propagating plate or to enlarge the whole apparatus to obtain the area of the necessary effective input surface as in the conventional apparatus in order to eliminate the influences by the reflected waves on the vibration propagating plate.

On the other hand, by combining the pulses having different phases, the detection waveform in the vibration sensor can be controlled into a desired shape and the detecting timing suitable to eliminate the influences by the noises of the reflected waves and the like on the vibration propagating plate or a special point on the waveform can be set. Therefore, it is possible to provide an excellent coordinates input apparatus which can detect the coordinates at a high accuracy and in which the reliability is high, the size is small, and the weight is light.

What is claimed is:

1. A coordinates input apparatus comprising:
   vibrator drive control means for outputting a vibrator drive signal which is obtained by synthesizing a plurality of pulse trains whose phases differ;
   vibration generating means for generating a vibration by a vibrator which generates the vibration in response to the vibrator drive signal output from said vibrator drive control means;
   a vibration propagating member for propagating the vibration generated by said vibration generating means;
   a plurality of vibration detecting means, attached to said vibration propagating member at a plurality of positions, for detecting the vibration generated by the vibration generating means at a plurality of positions; and
   coordinate value calculating means for calculating the propagating times from the vibrations detected at said plurality of positions by said plurality of vibration detecting means, thereby obtaining coordinate values on the vibration propagating member on which the vibration generating means is located from the propagating times calculated.

2. An apparatus according to claim 1, further having display means for displaying the position on the vibration propagating member corresponding to the coordinate values calculated by the coordinate value calculating means.

3. An apparatus according to claim 2, wherein said vibration propagating member is made of a transparent acrylic plate and is located on said display means.

4. An apparatus according to claim 1, wherein said vibrator drive control means outputs to the vibrator the vibrator drive signal which is obtained by synthesizing a plurality of pulse trains whose phases differ by 180° each other.

5. An apparatus according to claim 1, wherein said vibrator drive control means outputs to the vibrator the vibrator drive signal which is obtained by alternately synthesizing pulse trains whose phases differ by 180° each other.

6. An apparatus according to claim 1, wherein said vibration propagating member is formed of glass.

7. A coordinates input apparatus comprising:
   vibrator drive signal generating means for generating a vibrator drive signal obtained by synthesizing a plurality of pulse trains whose phases differ;
   vibration generating means for generating a vibration by a vibrator in response to the vibrator drive signal generated by said vibrator drive signal generating means;
   a vibration propagating member for propagating the vibration generated by said vibration generating means;
   at least one vibration detecting means attached to said vibration propagating member for detecting the vibration generated by said vibration generating means; and
   coordinates value calculating means for calculating the propagating time from the vibration detected by said vibration detecting means, thereby obtaining coordinates values of said vibration generating means on said vibration propagating member from the calculated propagating time.

8. An apparatus according to claim 7, further comprising display means for displaying information corresponding to the calculated coordinates value.

9. An apparatus according to claim 7, wherein said vibration propagating member is formed of acrylic.

10. An apparatus according to claim 7, wherein said vibration propagating member is formed of glass.

11. An apparatus according to claim 7, wherein said vibrator drive signal generating means generates the vibrator drive signal by synthesizing pulse trains whose phases differ by 180 degrees to said vibration generating means.

12. An apparatus according to claim 7, wherein said vibrator drive signal generating means generates the vibrator drive signal by alternately synthesizing pulse trains whose phases differ by 180 degrees to said vibration generating means.

13. A coordinates input apparatus comprising:
   vibrator drive signal generating means for generating a vibrator drive signal obtained by synthesizing a plurality of pulse trains whose phases differ;
   vibration generating means for generating a vibration by a vibrator in response to the vibrator drive signal generated by said vibrator drive signal generating means;
   a plurality of vibration detection means for detecting the vibration generated by said vibration generating means at their respective positions;
   coordinates value calculating means for calculating the propagating time from the vibration detected by said plurality of vibration detection means at the plurality of positions, thereby obtaining coordinates values of said vibration generating means from the calculated propagating time.

14. An apparatus according to claim 13, wherein said vibrator drive signal generating means generates the vibrator drive signal by synthesizing pulse trains whose phases differ by 180 degrees to said vibration generating means.

15. An apparatus according to claim 13, wherein said vibrator drive signal generating means generates the vibrator drive signal by alternately synthesizing pulse trains whose phases differ by 180 degrees to said vibration generating means.

* * * * *

UNITED STATES PATENT AND TRADEMARK OFFICE
CERTIFICATE OF CORRECTION

PATENT NO. : 4,910,363
DATED : March 20, 1990
INVENTOR(S) : KATSUYUKI KOBAYASHI ET AL.

It is certified that error appears in the above-identified patent and that said Letters Patent is hereby corrected as shown below: On title page,

AT [56] REFERENCES CITED

Insert Foreign Patent Documents,
--2179152A  2/1987  Great Britian..........
0169538  1/1986 European Pat. Off.........--.

COLUMN 9

Line 65, "each" should read --from each--.

COLUMN 10

Line 2, "each" should read --from each--.

Signed and Sealed this

Ninth Day of July, 1996

Attest:

BRUCE LEHMAN

Attesting Officer    Commissioner of Patents and Trademarks